(12) United States Patent
Yuille et al.

(10) Patent No.: US 7,817,855 B2
(45) Date of Patent: Oct. 19, 2010

(54) SYSTEM AND METHOD FOR DETECTING TEXT IN REAL-WORLD COLOR IMAGES

(75) Inventors: Alan Yuille, Los Angeles, CA (US); Xiangrong Chen, Sunnyvale, CA (US); Stellan Lagerstrom, Burlingame, CA (US); Daniel Terry, New York, NY (US); Mark Nitzberg, Oakland, CA (US)

(73) Assignee: The Blindsight Corporation, Berkeley, CA (US)

( * ) Notice: Subject to any disclaimer, the term of this patent is extended or adjusted under 35 U.S.C. 154(b) by 1079 days.

(21) Appl. No.: 11/516,147

(22) Filed: Sep. 5, 2006

(65) Prior Publication Data

US 2007/0110322 A1 May 17, 2007

Related U.S. Application Data

(60) Provisional application No. 60/711,100, filed on Sep. 2, 2005.

(51) Int. Cl.
*G06K 9/34* (2006.01)
(52) U.S. Cl. .................................. 382/176; 382/227
(58) Field of Classification Search ................ 382/176, 382/199, 200, 203–204, 181, 284, 321; 358/461, 358/462, 464; 707/3, 6; 706/12
See application file for complete search history.

(56) References Cited

U.S. PATENT DOCUMENTS

| | | | |
|---|---|---|---|
| 5,048,096 A | 9/1991 | Beato | |
| 5,754,684 A | 5/1998 | Kim | |
| 5,901,243 A | 5/1999 | Beretta | |
| 6,738,512 B1 * | 5/2004 | Chen et al. | 382/176 |
| 2005/0114313 A1 | 5/2005 | Campbell et al. | |
| 2005/0125402 A1 | 6/2005 | Viola et al. | |
| 2005/0144149 A1 | 6/2005 | Li et al. | |

OTHER PUBLICATIONS

Chen et al. ("Detecting and reading text in natural scenes," Proceedings of the 2004 IEEE Computer Society Conference on Computer Vision and Pattern Recognition (CVPR'04), vol. 2, pp. 366-373, Publication Date: Jun. 27-Jul. 2, 2004).*

PCT International Preliminary Report on Patentability, PCT/US2006/34618, 6 pages, dated Mar. 21, 2008.

PCT Notification of Transmittal of the International Search Report and the Written Opinion of the International Searching Authority, PCT/US2006/34618, 7 pages, dated Jul. 20, 2007.

* cited by examiner

*Primary Examiner*—Duy M Dang
(74) *Attorney, Agent, or Firm*—Blakely, Sokoloff, Taylor & Zafman, LLP; Judith A. Szepesi

(57) ABSTRACT

A method and apparatus for detecting text in real-world images comprises calculating a cascade of classifiers, the cascade comprising a plurality of stages, each stage including one or more weak classifiers, the plurality of stages organized to start out with classifiers that are most useful for ruling out non-text regions, and removing regions classified as non-text regions from the cascade prior to completion of the cascade, to further speed up processing.

20 Claims, 4 Drawing Sheets

System Diagram

Figure 1. System Diagram
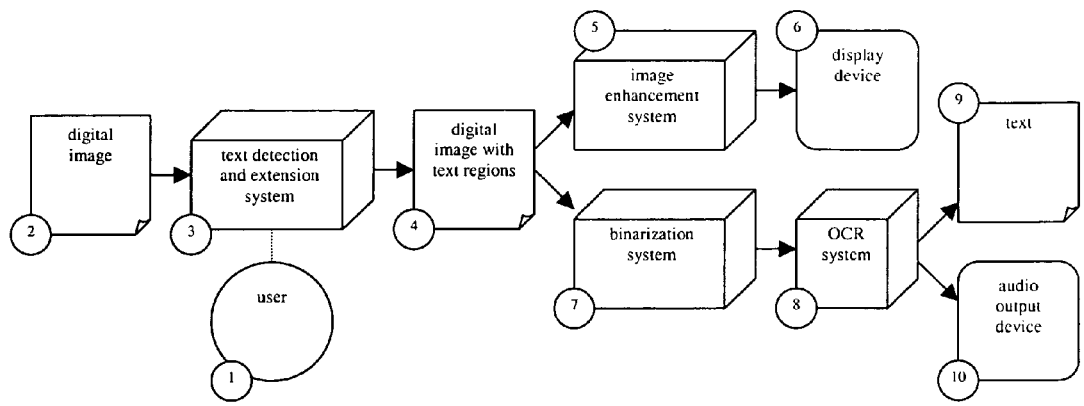

↓ Image
(1) Divide image into regions
↓ Regions
(2) Detection Algorithm
    Cascade Level 1 → (3) Discard rejected regions
    ↓ (4) Accepted regions
    Cascade Level 2 → Discard rejected regions
    ↓ Accepted regions
    ...
    Cascade Level n → Discard rejected regions
    ↓ (5) Accepted regions with confidence values
(6) Cluster regions
    ↓ Clustered regions
(7) Extend and optionally binarize regions
    ↓ Image with outlined and labeled regions

*Figure 2. Detection Process*

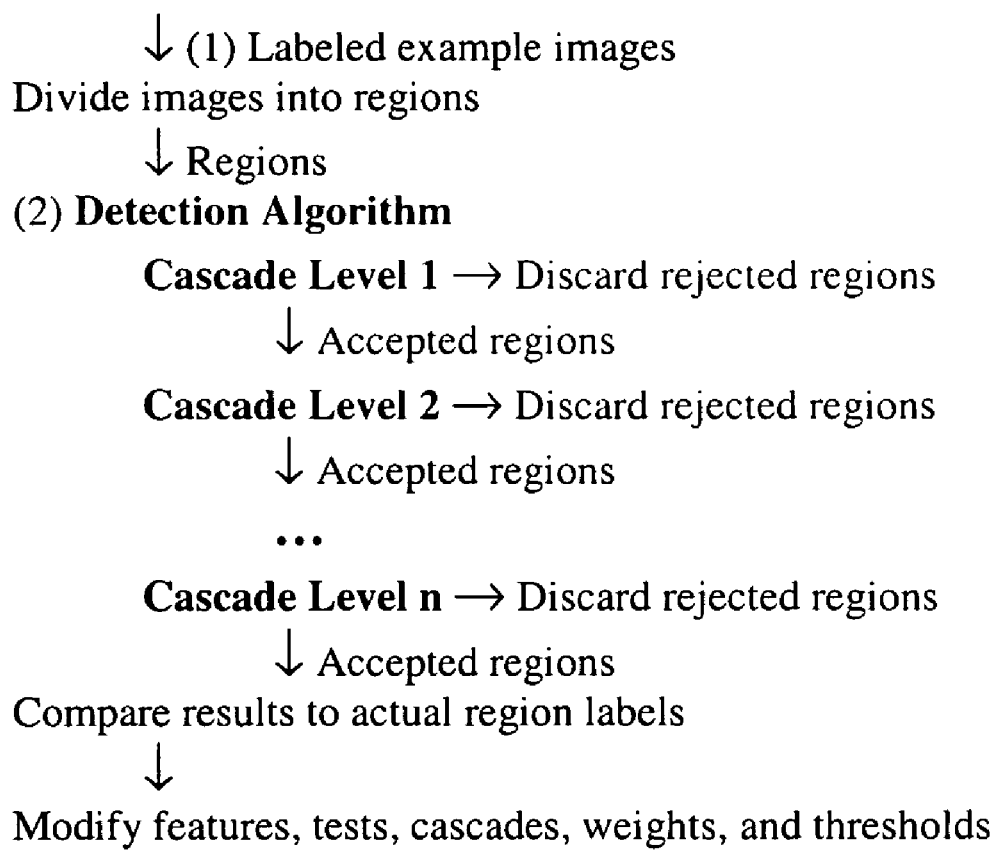
Figure 3. Training Process

SYSTEM AND METHOD FOR DETECTING TEXT IN REAL-WORLD COLOR IMAGES

RELATED APPLICATIONS

The present invention claims priority to U.S. Provisional Patent Application No. 60/711,100, filed Sep. 2, 2005.

U.S. GOVERNMENT RIGHTS

This invention was made with United States government support under Grants R44EY011821 and R44EY014487 from the National Institutes of Health (NIH). The United States Government has certain rights in this invention.

FIELD OF THE INVENTION

The present invention relates to image analysis, and more particularly to identifying images in real-world

BACKGROUND

The challenge of text detection has been attempted to be addressed by many efforts. The accurate detection and identification of text in documents has been achieved via optical character recognition. This method is most effective with high-quality, black and white documents that make it easy to segment the images into text and non-text regions—a much simpler problem than detecting and reading text in diverse, real-world, color images. The detection of captions in video sequences is also largely a solved problem due to fact that the position and size of captions are generally standardized, and the backgrounds change rapidly while the captions change more slowly. This too is a simpler problem than real-world text detection because of the presence of these additional image cues.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates one embodiment of the data flow in the system.

FIG. 2 is a flowchart of one embodiment of the process used by the system to detect text.

FIG. 3 is a flowchart of one embodiment of how the detection system can be trained and customized for new applications or configurations using labeled training images.

DETAILED DESCRIPTION

Figure 4:
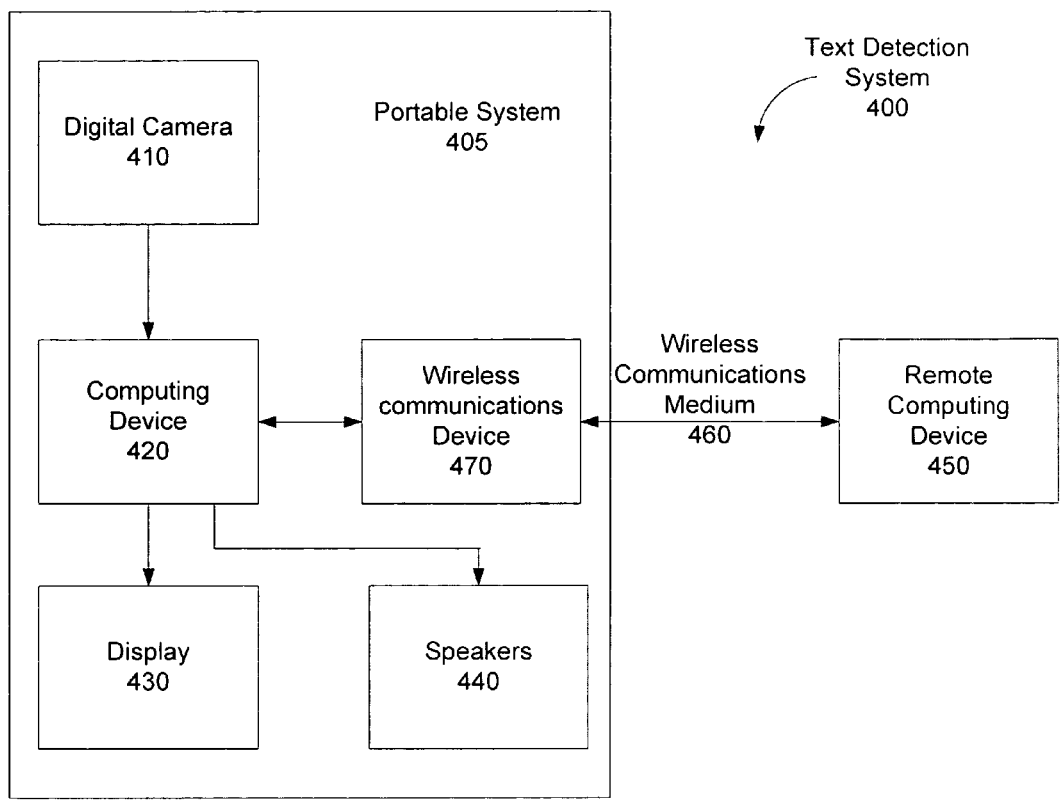
FIG. 4 is a block diagram of one embodiment of the text detection system.

The method and apparatus described is designed is provide a system and method for detecting and reading text in real-world color images or video taken in a diverse range of environments, such as indoor environments and outdoor street scenes. The system and method are accurate even with different fonts and sizes of text, changes in lighting, and perspective distortions due to viewer angle. At the same time, this system and method for text detection has a rapid processing time while maintaining a low rate of false positives and negatives. The system and method uses a learning algorithm that enables it to adapt to novel image domains and new hardware components such as different cameras and mobile devices including cell phones. While the examples below address text detection, this algorithm may be used for detecting other types of data in images, such as UPC codes, or other orderly marking systems.

System and Method

The system receives color or black and white digital image as input and outputs outlined and labeled regions indicating where text is present in the image. In one embodiment, the "digital image" may be a frame from a video, a digitized image, a digital photograph, or any other type of data which can be presented as one or more digital images.

FIG. 1 illustrates one embodiment of the data flow in the system. The user (1) submits a digital image (2) for processing by the text detection and extension system (3). The system processes the original digital image and outputs a digital image with outlined and labeled regions indicating where text is present (4). This image and its associated text regions can be loaded into a subsequent image enhancement system (5), and shown on a display device (6). Alternatively, or additionally, the image and its text regions can be binarized by the system (7), loaded into an optical character recognition system (8), and output as text (9), output in Braille or another format, read aloud via an audio output device (10), or output via other means. In one embodiment, the output may be a summary or other short version of the text. In one embodiment, the output may be further processed for outputting in a different language or different format.

In its various embodiments, the system may exist as a standalone computing device, an application on a computing device, or a plug-in or extension to an existing application on a computing device.

FIG. 2 is a flowchart of one embodiment of the process used by the system to detect text. In one embodiment, the digital image is broken into multiple layers of regions of various sizes (1). In one embodiment, this is done using a standard pyramid algorithm. Each individual region is fed into the detection algorithm. In one embodiment, the regions are fed into the detection algorithm in parallel. Alternatively, the regions may be analyzed in series. The ordering of the regions may be modified for optimal results in a variety of application domains and tasks.

In one embodiment, the detection algorithm (2) consists of cascading levels of tests (classifiers). Each cascade level contains one or more individual tests that are performed in series. Each test uses one or more image features that detect cues indicating the possible presence of text in the region being analyzed. Each test yields a confidence value for the region; the region passes the test if its confidence value is greater than the threshold value for that test. After passing each test, the region's overall confidence value for the cascade level is updated, and the region is either submitted to the subsequent test in that level, accepted for that level, or rejected for that level depending on how its overall confidence value compares to the overall threshold value for the cascade level.

If the region is rejected at any cascade level, it is not processed further (3). If the region is accepted by a cascade level, it is passed on to the next level of the cascade for further testing (4). In one embodiment, if the confidence value is high enough, the region may be accepted and not passed to further testing. Image regions which are accepted by all cascade levels are given an overall confidence value (5). In one embodiment, the overall confidence value (5) is based on the region's performance in the final level of the cascade. Alternatively, the overall confidence value may be a cumulative value based on results from multiple levels of the cascade.

Once all regions have been accepted or rejected by the detection algorithm, overlapping and adjacent regions are clustered (6) to create larger contiguous regions. These larger regions are each given a confidence value based on the confidence values of their smaller constituent regions. At this stage, the specific outline of each region is determined, and the regions are labeled using their confidence values.

Once the final text-containing regions have been determined, in one embodiment, an extension algorithm (7) is used to expand the regions to include nearby text or truncated characters. The region, in one embodiment, can also be binarized as desired before being output to the user or to another image processing system.

FIG. 3 is a flowchart of one embodiment of how the detection system can be trained and customized for new applications or configurations using labeled training images.

A set of example images from a new application domain are human-labeled to indicate regions with and without text. In another embodiment, if such a thing is available, a set of example images with known good automatically labeled regions may be utilized. In one embodiment at least 100 images are used for training. These images (1) are then fed to the system in training mode to allow it to learn to successfully detect text in the new domain. The training mode can also be used to refine the system's text detection when a new image capture device or type of image is used.

In training mode, the system processes the training images using the detection algorithm (2) just as it does in regular mode. After the regions have been accepted or rejected, the system compares them to the actual labels to determine the accuracy of the algorithm. The system then adapts the algorithm, selecting the most effective features for each test, the most effective ways to order and combine the tests and cascade levels to produce more accurate results, and the most effective test weights and thresholds for the calculations. The training system seeks to reduce the number of false positive and false negative text detections. It also seeks to minimize the processing time for the first few cascade levels. This ensures that most regions of the image can be rapidly rejected by only a small number of tests, making the overall detection algorithm more time-efficient. In one embodiment, an authorized user can manually modify or refine the cascade levels, tests, and weights to further customize the system.

One type of learning algorithm that may be used is the AdaBoost machine learning algorithm. The various detection cascade levels in the system can use this algorithm to process and detect text in regions of the image.

Tests (Classifiers) Used in One Embodiment

In the preferred embodiment of this system, rectangular image regions of various sizes are used to analyze predefined image features. In one embodiment, the rectangular regions are selected using a standard pyramid algorithm. In one embodiment, luminance (brightness) values of the pixels are used in the detection process, while color information is used later in the binarization process.

In one embodiment, an AdaBoost cascade with 7 layers is used. Each layer of the cascade contains 1 to 30 tests. Each test uses one or more image feature values, each of which is sorted into bins by comparing it with test-specific threshold values. The threshold values are set by the system during training as described earlier in this document. The bin numbers are used as an index to a test-specific n-dimensional matrix, where the value at the intersection is either true or false, which specifies the result of the test as a whole. The specific image features used in one embodiment of each test are listed below.

In one embodiment, each test is given a weight that is used when combining the individual test results within the cascade layer into an overall result for the layer. The overall result is updated as each test is performed to determine if the image region can be accepted or rejected by the layer, or if the next test in the layer must be performed.

The layers, classifiers, and image features in the preferred system embodiment are as follows. Classifier weights are given as well, but could be further refined through system training. The individual image features used in each classifier are defined later in this document. Note that these layers, classifiers, image features, and classifier weights are merely exemplary, and one of skill in the art would understand that the layers may be reorganized, altered, or removed from the cascade without changing the underlying idea.

This is an exemplary cascade, including seven layers. The classifiers are explained in more detail below.

Adaboost Layer 1: 1 Weak Classifier

| | Classifier | Weight |
|---|---|---|
| 1 | D3, D4 | 4.626257 |

Adaboost Layer 2: 1 Weak Classifier

| | Classifier | Weight |
|---|---|---|
| 1 | D0, D3 | 4.278939 |

Adaboost Layer 3: 5 Weak Classifiers

| | Classifier | Weight |
|---|---|---|
| 1 | D4, D15 | 3.870142 |
| 2 | D0, D3 | 2.046390 |
| 3 | D4, D15 | 1.947373 |
| 4 | S6, D14 | 1.538185 |
| 5 | S5, S11 | 1.069461 |

Adaboost Layer 4: 10 Weak Classifiers

| | Classifier | Weight |
|---|---|---|
| 1 | D7, D14 | 3.886540 |
| 2 | D0, D4 | 1.752814 |
| 3 | M0, D13 | 1.367982 |
| 4 | D3, D14 | 1.274082 |
| 5 | D0, D6 | 0.967092 |
| 6 | S11, D17 | 0.873878 |
| 7 | S3, D13 | 0.942438 |
| 8 | D1, D14 | 0.840898 |
| 9 | S5, S10 | 0.666019 |
| 10 | S4, D4 | 0.660017 |

Adaboost Layer 5: 22 Weak Classifiers

|    | Classifier | Weight   |
|----|------------|----------|
| 1  | S5, D6     | 3.951040 |
| 2  | D4, D14    | 1.571396 |
| 3  | D0, D15    | 1.308625 |
| 4  | S6, D3     | 1.025399 |
| 5  | S4, D14    | 0.823495 |
| 6  | S9, D4     | 0.872460 |
| 7  | S4, D16    | 0.743971 |
| 8  | D4, D13    | 0.736302 |
| 9  | D0, D3     | 0.665261 |
| 10 | M0, D14    | 0.630531 |
| 11 | S5, D6     | 0.684585 |
| 12 | S3, D3     | 0.587298 |
| 13 | D3, D4     | 0.578154 |
| 14 | M3, S11    | 0.566080 |
| 15 | S3, D13    | 0.496378 |
| 16 | S5, S10    | 0.490426 |
| 17 | S0, D1     | 0.526227 |
| 18 | M0, M3     | 0.473949 |
| 19 | D4, D12    | 0.436995 |
| 20 | M0, M2     | 0.490757 |
| 21 | S4, D14    | 0.501030 |
| 22 | D0, D2     | 0.520316 |

Adaboost Layer 6: 30 Weak Classifiers

|    | Classifier | Weight   |
|----|------------|----------|
| 1  | D3, D4     | 3.001183 |
| 2  | D0, D16    | 1.351147 |
| 3  | D3, D13    | 1.121551 |
| 4  | S5, D4     | 0.758123 |
| 5  | D3, D5     | 0.656535 |
| 6  | S3, D13    | 0.712661 |
| 7  | M0, D14    | 0.653778 |
| 8  | D0, D4     | 0.601257 |
| 9  | M3, S8     | 0.556955 |
| 10 | S4, D13    | 0.510116 |
| 11 | D0, D16    | 0.519914 |
| 12 | S4, D4     | 0.548812 |
| 13 | S0, D18    | 0.490303 |
| 14 | S9, D13    | 0.453983 |
| 15 | S3, D15    | 0.470483 |
| 16 | D1, D15    | 0.526004 |
| 17 | D0, D14    | 0.417721 |
| 18 | M0, S0     | 0.433557 |
| 19 | S4, D14    | 0.415910 |
| 20 | S5, D2     | 0.444604 |
| 21 | S6, D14    | 0.424369 |
| 22 | D0, D1     | 0.379253 |
| 23 | S3, D13    | 0.405478 |
| 24 | D4, D13    | 0.472468 |
| 25 | S4, D14    | 0.407701 |
| 26 | D1, D2     | 0.397965 |
| 27 | M2, S0     | 0.378079 |
| 28 | S0, D3     | 0.387972 |
| 29 | S10, D12   | 0.371740 |
| 30 | M0, S0     | 0.370144 |

Adaboost Layer 7: 30 Weak Classifiers

|    | Classifier | Weight   |
|----|------------|----------|
| 1  | E0, E1     | 4.140843 |
| 2  | H5, H11    | 0.981255 |
| 3  | H6, H10    | 0.707663 |
| 4  | H0, H3     | 0.644695 |
| 5  | H13, E0    | 0.558645 |
| 6  | H8, H9     | 0.531337 |
| 7  | H1, E3     | 0.420097 |
| 8  | H2, E0     | 0.407218 |
| 9  | H3, H7     | 0.374002 |
| 10 | H7, H11    | 0.360664 |
| 11 | H10, E2    | 0.331540 |
| 12 | H0, H1     | 0.302133 |
| 13 | H5, H10    | 0.312395 |
| 14 | H1, E4     | 0.272916 |
| 15 | E0, E5     | 0.281763 |
| 16 | H1, H9     | 0.290753 |
| 17 | H2, E0     | 0.262424 |
| 18 | H0, H6     | 0.250681 |
| 19 | H10, E4    | 0.259521 |
| 20 | H2, H3     | 0.252718 |
| 21 | H8, H13    | 0.235930 |
| 22 | H0, E5     | 0.227033 |
| 23 | H10, H12   | 0.211346 |
| 24 | H5, H11    | 0.250197 |
| 25 | H5, E2     | 0.264241 |
| 26 | H1, H8     | 0.199238 |
| 27 | H9, E0     | 0.189235 |
| 28 | H7, H11    | 0.194733 |
| 29 | H13, E3    | 0.189933 |
| 30 | E0, E3     | 0.182727 |

Image Features

In the preferred embodiment of this system, the image features used in the classifiers are grouped and defined as follows. These features as well as their positions within the cascade (described above) define only one, of many possible, configurations of the system. This particular configuration is the product of much fine tuning and is optimized to detect text in real world images.

Group A. In this group, the region is divided into 3 subregions. In one embodiment the division is horizontal (like a Spanish flag). The subregions from the top have mean values of luminance of m1, m, and m2. In the current implementation, m1 and m2 are of equal height, each ⅛ of the total height, while m is ¾th of the total height.

|     |
|-----|
| m1  |
| m   |
| m2  |

The classifiers of Group A are:
M0. m
M1. m1−m
M2. m2−m
M3. (m1−m)*(m2−m)

Group B. This group is divided as in group A, but the values used are based on the standard deviation (STD) of the luminance values in the region. From the top the values are referred to as s1s, and s2.

|     |
|-----|
| s1  |
| s   |
| s2  |

The classifiers of Group B are:
S0. s
S1. s1
S2. s2
S3. s1/s
S4. s2/s

Group C. This group uses the same s, s1 and s2 as in group B, but divides the s region horizontally into two equal parts and computes the standard deviation of luminance values within the two parts of the newly divided region, referring to them as s3 and s4.

|     |
| --- |
| s1  |
| s3  |
| s4  |
| s2  |

The classifiers of Group C are:
S5. s3/s
S6. s4/s

Group D. This group uses the same s1 and s2 as in group B, and divides s vertically into two equal parts with STDs s5 and s6.

| s1 |    |
| -- | -- |
| s5 | s6 |
| s2 |    |

The classifiers of Group D are:
S7. s5/s
S8. s6/s

Group E. This group uses the same s1 and s2 as in group B, and divides s vertically into three equal parts with STDs s7, s8, and s9.

| s1 |    |    |
| -- | -- | -- |
| s7 | s8 | s9 |
| s2 |    |    |

The classifiers of Group E are:
S9. s7/s
S10. s8/s
S11. s9/s

Group F. This group uses the same divisions and s as group B, but calculates the mean of the absolute value of the horizontal gradient for all vertical-edge pixels in of the subregions: from the top, dx1, dx, and dx2.

The horizontal gradient at each pixel is defined as the result of this Sobel convolution kernel:

| −1 | 0 | 1 |
| -- | - | - |
| −2 | 0 | 2 |
| −1 | 0 | 1 |

The vertical gradient at each pixel is defined as the result of this Sobel convolution kernel:

| 1  | 2  | 1  |
| -- | -- | -- |
| 0  | 0  | 0  |
| −1 | −2 | −1 |

If the absolute value of the vertical gradient is lager than the horizontal, the pixel is a horizontal-edge pixel, otherwise a vertical-edge pixel.

The classifiers of Group F are:
D0. dx/s
D1. dx1/s
D2. dx2/s
D3. dx1/dx
D4. dx2/dx Group G. This group uses the same dx as group F, and also divides that region as in group C with mean horizontal gradients dx3 and dx4.

The classifiers of Group G are:
D5. dx3/dx
D6. dx4/dx

Group H. This group uses the same dx as group F, and also divides that region as in group D with mean vertical gradients dx5 and dx6.

The classifiers of Group H are:
D7. dx5/dx
D8. dx6/dx

Group I. This group uses the same dx as group F, and also divides that region as in group E with mean vertical gradients dx7, dx8, and dx9.
D9. dx7/dx
D10. dx8/dx
D11. dx9/dx Groups J, K, L, and M are analogous to groups F, G, H, and I but use the mean of the absolute value of the vertical gradient for all horizontal-edge pixels in of the subregions.

D12-D23 are then analogous to D0-D11.

Group N. This group is based on a histogram of the Sobel gradient directions in the region. Using the horizontal and vertical Sobel gradients as above for each pixel, the direction is determined as 0-8, where 0-7 signify N, NE, E, SE, S, SW, W and NW and 8 indicates a flat, edgeless region. d[n] is then the proportion of pixels with the gradient direction value n.
H0. d[0]+d[4]
H1. d[1]+d[5]
H2. d[2]+d[6]
H3. d[3]+d[7]
H4. d[4]
H5. d[5]
H6. d[6]
H7. d[7]

Group O. This group is based on an adaptive histogram of the values calculated as dx, in group F, above. In the current embodiment, three buckets are used; hdx[0] is the relative number of pixels with horizontal gradients in the lowest third of the range, etc.
H8. hdx[0]
H9. hdx[1]
H10. hdx[2]

Group P. This group is analogous to group O, but uses dy.
H11. hdy[0]
H12. hdy[1]
H13. hdy[2]

Group Q. This group divides the entire region into horizontal stripes of equal size. In the current embodiment, 3 stripes are used. For each stripe, the average of the absolute value of the horizontal difference is calculated. The following convolution kernel is used:

| 0  | 0 | 0 |
| -- | - | - |
| −1 | 1 | 0 |
| 0  | 0 | 0 | edx[n] is the average for the stripe n.

The classifiers for Group Q are:
E0. edx[0]−edx[1]
E1. edx[1] Center stripe
E2. edx[2]−edx[1]

Group R. This group is like group Q, except for each horizontal stripe, the average of the absolute value of the vertical difference is calculated. The following convolution kernel is used:

| 0 | −1 | 0 |
|---|----|---|
| 0 | 1  | 0 |
| 0 | 0  | 0 | edy[n] is the average for the stripe n.
The classifiers for Group R are:
E3. edy[0]−edy[1]
E4. edy[1] Center stripe
E5. edy[2]−edy[1]

In the preferred embodiment, the following method is used to calculate the posterior probability value for a rectangular region once it has been identified as a text region.

```
float CAdaBClassifier::Classify(CASample *pSample)
{
    float fAlpha = 0;
        // m_fSumAlpha is really 1/2\sum\alpha
    float fRes = m_fSumAlpha + m_fSumAlpha;
    float p, fVal;
    int nClassifiers = m_vpClassifiers.size( );
    for (int i = 0; i < nClassifiers; i ++)
    {
        CAClassifier *pClassifier = m_vpClassifiers[i];
        p = pClassifier->Classify(pSample);
        //weak classifier returning 0 or 1
        fVal = m_vfAlpha[i]; //weight from training
        // 0.5 == probability of text
        // this implements \sum\a_ih_i
        // assuming p is 0 or 1
        // this should be fAlpha += fVal * p in general
        if (p > 0.5)
        {
            fAlpha += fVal;
            if (fAlpha > m_fSumAlpha) break;
        }
        // test if can't ever reach threshold (assumes p \in[0,1])
        fRes -= fVal;
        if (fAlpha + fRes < m_fSumAlpha) break;
    }
    // WARNING: final Adaboost posterior NOT fully computed in most cases
    // returns a negative number if fAlpha < 0.5
    return (fAlpha - m_fSumAlpha);
}
```

In on embodiment, overlapping detected rectangles are joined, and the total posterior probability is calculated:

$$p = 1 - \prod_i (1 - p(i)).$$

Image Extension and Binarization

In one embodiment of the image extension and binarization process, an algorithm is first applied to the detected regions to classify individual pixels as non-text or potential-text. In one embodiment, for each pixel the algorithm examines neighborhoods of increasing size centered at that pixel until it finds one with a luminance variance above a given variance threshold. Two neighborhood thresholds are then created, TLight=$\mu$+k$\sigma$ and TDark=$\mu$−k$\sigma$ where and p and a are the mean and variance within the selected neighborhood respectively, and k is a constant. This process produces a three-band image in which each pixel has been classified as non-text, light potential-text, or dark potential-text.

Neighboring pixels within the same band (light potential-text and dark potential-text) are grouped into connected components (denoted cc's) and each connected component is then classified as text or non-text. This is accomplished using a number of statistics including the number of pixels in the cc (NP), the number of cc pixels on the border of the cc's bounding box (NB), the height of the bounding box (h), the width of the bounding box (w), the ratios h/w and NP/w*h, and a measure of the local size of the text as determined by the detection algorithm (MS).

Following the removal of non-text cc's, the system groups words or stray cc's into lines of text and uses the context of nearby cc's to reject any cc's that do not fit into any group. This is accomplished by calculating the bounding box for each cc and giving it a label i. The system then calculates features like the center of the box (xi, yi), the height (hi), the average luminance intensity of the box (li).

A color distance cdist (i,j) between the colors of two cc's i,j is computed, in one embodiment, by:

1. Computing a set for each cc consisting of the color values for each pixel in the cc in 3-dimensional YCrCb space with values in the range [0,255]. Call these $C_i$ and $C_j$, producing vectors of 3D points.
2. Computing the average points as the geometric center of gravity of these vectors: $\mu_i$ and $\mu_j$, both 3D points.
3. Taking the smaller of the two Mahalanobis distances $D_M$ between one average point and the other vector.

$$cdist(i,j) = \min(D_{Mi}(\mu_j), D_{Mj}(\mu_i))$$

The result will be in the range [0,441]. (sqrt(3·255²)]
The distance (dist) between two cc's i, j is then defined as $$dist(i,j) = (w_x|x_i-x_j| + w_y|y_i-y_j| + w_h|hi-hj|)/s + w_l|l_i-l_j| + w_C \cdot cdist(i,j),$$

where s is the expected height of characters, computed as the average height of the detection rectangles that were merged to produce the detected region and w's are constants selected to maximize the performance of the system. In one embodiment the values of w used by this system are:

$w_x$=1.0, $w_y$=0.7, $w_l$=0.01 for $l_i$ in [0,255], $w_h$=0.3, $w_C$=0.05.

By using this metric, each cc is grouped with its closest neighbors. Neighbors are then grouped into lines of text. Grouping never extends beyond a constant distance T. The algorithm thus rejects a cc(k) provided dist(k, l)>T, for all l. In one embodiment the value of T used is 2.2.

Recovery

For each of these groups, in one embodiment, a baseline is fitted through the centers using robust regression (giving low weight to outliers). In one embodiment, every rejected cc(k) is tested against each group and recovered if all of the following conditions are true:

1. The cc height (hk) is close to the average height of the group (hg).

$T_a * h_g < h_k < T_b * h_g.$

2. The vertical distance between the center of the cc and the baseline is less than $T_v * h_g$.
3. The cc's color is close to the nearest cc of the group (n). Cdist(k,n)<$T_r$ In one embodiment the values for these constants are
$T_a=0.8$
$T_b=1.5$
$T_v=0.5$
$T_r=1.1$ In one embodiment, if any groups adjoin the edges of the detection region, the region is expanded. Then, the above described binarization process is applied to the newly included area(s), and any cc's found there are submitted to the same recovery process as above, if originally rejected.

Performance and Error Reporting and Categorization:

In one embodiment, the system has the ability to store the results of the various intermediate stages into a database along with any useful annotations about those intermediate results. When the system is run in this mode on an entire dataset the database gets populated with a large amount of detailed information that can be used to calculate specific performance metrics as well as pinpoint and categorize sources of error.

Used in conjunction with detailed ground truth (that has all pixels in the dataset labeled as text/non-text and each text character labeled with its value—e.g. "a") the database can be used locate errors in virtually every step of the algorithm:

1. The database may include an image corresponding to the output of the initial stage of binarization in which pixels have been classified as "non-text, light potential-text, or dark potential-text." For each region of detected text, this image can be compared to the ground truth in order to gather a set of examples where individual pixels have been mistakenly classified as text or non-text.
2. The database may also contain an image corresponding to the result of the text/non-text connected component classifier. This can be used to gather a group of examples where cc's are incorrectly classified as text or non-text.
3. The database may further contain an image corresponding to the result of the character/word grouping and can be used to find examples where characters are incorrectly grouped together into words or where they are incorrectly not grouped into words.
4. Finally the database may store the output of the OCR system which can be compared to the true characters in each word to determine in what cases the OCR system fails.

In this way, the database may be used in conjunction with analysis to further tweak the settings of the system.

Hardware Implementation in One Embodiment

FIG. 4 is a block diagram of one embodiment of the text detection system. In one embodiment, the entire text detection system 400 consists of a digital camera 410, a computing device 420 (including processor, program code, and data storage), optionally a display 430, and/or speakers 440 in a wearable configuration 405. The system 400, in one embodiment, is designed to be used by blind or visually impaired persons to help detect and identify text including street signs, bus numbers, shop signs, and building directories. When coupled with additional image enhancement or OCR systems, the system in the embodiment can be used to visually enhance and display these regions of text and optionally read them aloud to the user. The integration of OCR systems can also enhance the performance of the system by ruling out false positives that cannot be classified as characters and words. In one embodiment alternative outputs, such as Braille, or translated output, may also be used.

In one embodiment the digital camera 410 may be integrated into a multi-function wireless communications device 470 that either (a) contains sufficient computing power to perform the computation described above in a reasonably short time, or (b) is able to transfer the digital image—or subregions thereof detected as likely text regions—to a more powerful remote computing device 450 elsewhere via a wireless communications medium 460, wait for the remote computing device 450 to perform the computation describe above, and receive the resulting text in a response from the remote computing device 450, all within a reasonably short time.

In one embodiment, the wireless communications medium 460 may be a cellular network, a wireless connection such as a WiFi connection, or any other connection which enables the communications device 470 to communicate with a remote device. The remote computing device 450 may be a personal computer running a program, or may be a server system accessed through the Internet.

Other embodiments of the system may serve as an image processing and text detection algorithm component within larger applications or computing devices. For example, applications may include (a) a sign reader to assist drivers by automatically reading street signs aloud, (b) a generalized text reader/translator for tourists or military personnel in foreign lands where they cannot understand the language—or even the alphabet—of signs and other text, or (c) a system, such as a web crawler, designed to detect and index the location and value of text in images on the world wide web or in any other set of images.

In one embodiment, the present system functions well to detect text in various languages, including non-Latin languages such as Cyrillic, Chinese, Arabic, etc. Furthermore by modifying the feature choice and training the system on new datasets other embodiments may serve to detect various families of graphics such as text in other non-Latin writing systems such as Cuneiform, Hieroglyphics, etc., as well as other classes of targets such as bar codes, logos, etc. that may be derived from or resemble an orderly marking system.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of detecting text in real-world images comprising:
    dividing an image representing a real-world scene into one or more regions;
    calculating a cascade of classifiers, the cascade comprising a plurality of stages, each stage including one or more weak classifiers, the plurality of stages organized to start out with classifiers that are most useful for ruling out non-text regions of the image;
    feeding the one or more regions into the cascade; and
    removing regions of the image classified as the non-text regions from the cascade prior to completion of the cascade to avoid subsequent processing of the removed regions;
    utilizing a binarization process including classifying individual pixels as one of: non-text, light potential-text, and dark potential-text based on one or more factors including:
        a number of pixels in the connected component;

a number of pixels on the border of the connected component;
a height of the connected component;
a width of the connected component;
a ratio of the height of the connected component to the width of the connected component;
a ratio of the pixels in the connected component to the width of the connected component multiplied by the height of the connected component;
a local size of text in the connected component;
outputting binarization output data.

2. The method of claim 1, wherein the cascade comprises seven AdaBoost layers.

3. The method of claim 2, wherein each layer of the cascade has an equal or greater number of classifiers than each previous layer of the cascade.

4. The method of claim 2, wherein the classifiers in layers are secondarily ordered based on speed of computation.

5. The method of claim 1, further comprising:
outputting an output data comprising identified text regions separated from non-text regions.

6. The method of claim 1, further comprising utilizing two neighborhood thresholds: $TLight = \mu + k\sigma$ and $TDark = \mu - k\sigma$ where and $\mu$ and $\sigma$ are the mean and variance within the selected neighborhood respectively, and k is a constant.

7. The method of claim 1, further comprising:
grouping the pixels into connected components based on their classification and proximity to other pixels.

8. The method of claim 1, further comprising grouping the connected components into lines of text based on a color distance between colors of two connected components.

9. The method of claim 1, further comprising removing regions classified as text regions from the cascade prior to completion of the cascade when a confidence level exceeds a threshold, wherein the confidence level indicates the likelihood of a region being a text region.

10. A system for detecting text in real-world images comprising:
a processor including:
a dividing logic to divide an image into one or more regions;
a calculating logic to calculate a cascade of classifiers, the cascade comprising a plurality of stages, each stage including one or more weak classifiers, wherein the plurality of stages is organized to start out with classifiers that are most useful for ruling out non-text regions;
a feeding logic to feed the one or more regions into the cascade remove non-text image regions logic to remove image regions classified as the non-text regions from the cascade prior to completion of the cascade, to avoid subsequent processing of the removed regions;
binarization logic including logic to classify individual pixels as one of: non-text, light potential-text, and dark potential-text; and
a training system including:
a feed logic to feed training images into the cascade;
a comparison logic to compare classifier results to known training image results; and
an adapting logic to adapt one or more of an order of stages in cascade of classifiers, an order of classifiers in the stages, one or more classifiers confidence level thresholds, and the classifiers by selecting features for each classifier that reduce the number of false positive and false negative detections by a reduced number of tests.

11. The system of claim 10, further comprising:
an outputting logic to output an output data comprising identified text regions separated from non-text regions.

12. The system of claim 10, further comprising binarization logic including:
logic to classify individual pixels as one of: non-text, light potential-text, and dark potential-text.

13. A non-transitory computer readable medium storing instructions thereon which, when executed by a system, cause the system to perform a method comprising:
dividing an image into one or more regions;
calculating a cascade of classifiers, the cascade comprising a plurality of stages, each stage including one or more weak classifiers, wherein the plurality of stages is organized to start out with classifiers that are most useful for ruling out non-text regions of the mage;
receiving training images;
feeding the training images into the cascade;
comparing classifier results to known training image results;
adapting one or more of an order of stages in the cascade, an order of classifiers in the stages, one or more classifier confidence level thresholds, and the classifiers by selecting features for each classifier that reduce a number of false positive and false negative detections by a reduced number of tests;
feeding the one or more regions into the cascade; and
removing regions of the image classified as the non-text regions from the cascade prior to completion of the cascade to avoid subsequent processing of the removed regions.

14. The computer readable medium of claim 13, further comprising: outputting an output data comprising identified text regions separated from non-text regions.

15. The computer readable medium of claim 13, further comprising utilizing a binarization process including:
classifying individual pixels as one of: non-text, light potential-text, and dark potential-text; and
outputting binarization output data.

16. A method of detecting text in real-world images comprising:
dividing an image representing a real-world scene into one or more regions;
calculating a cascade of classifiers, the cascade comprising a plurality of stages, each stage including one or more weak classifiers, the plurality of stages organized to start out with classifiers that are most useful for ruling out non-text regions of the image;
receiving training images;
feeding the training images into the cascade;
comparing classifier results to known training image results; and
adapting one or more of an order of stages in the cascade, an order of classifiers in the stages, one or more classifier confidence level thresholds, and the classifiers by selecting features for each classifier that reduce a number of false positive and false negative detections by a reduced number of tests;
feeding the one or more regions into the cascade; and
removing regions of the image classified as the non-text regions from the cascade prior to completion of the cascade to avoid subsequent processing of the removed regions; and
displaying a result.

17. The method of claim 16, further comprising:
utilizing a binarization process including classifying individual pixels as one of: non-text, light potential-text, and dark potential-text based on one or more factors including:
a number of pixels in the connected component;
a number of pixels on the border of the connected component;
a height of the connected component;
a width of the connected component;
a ratio of the height of the connected component to the width of the connected component;
a ratio of the pixels in the connected component to the width of the connected component multiplied by the height of the connected component;
a local size of text in the connected component.

18. The method of claim 16, further comprising utilizing two neighborhood thresholds: $TLight=\mu+k\sigma$ and $TDark=\mu-k\sigma$ where and $\mu$ and $\sigma$ are the mean and variance within the selected neighborhood respectively, and k is a constant.

19. The method of claim 16, further comprising grouping the connected components into lines of text based on a color distance between colors of two connected components.

20. The method of claim 16, further comprising removing regions classified as text regions from the cascade prior to completion of the cascade when a confidence level exceeds a threshold, wherein the confidence level indicates the likelihood of a region being a text region.

* * * * *